United States Patent
Kiyota et al.

(10) Patent No.: US 12,084,117 B2
(45) Date of Patent: Sep. 10, 2024

(54) HOLE PLUG

(71) Applicants: PIOLAX, INC., Kanagawa (JP); HONDA MOTOR CO., LTD., Tokyo (JP)

(72) Inventors: Hikaru Kiyota, Kanagawa (JP); Nobuyuki Nakanishi, Saitama (JP)

(73) Assignees: PIOLAX, INC., Kanagawa (JP); HONDA MOTOR CO., LTD., Tokyo (JP)

(*) Notice: Subject to any disclaimer, the term of this patent is extended or adjusted under 35 U.S.C. 154(b) by 676 days.

(21) Appl. No.: 17/197,786

(22) Filed: Mar. 10, 2021

(65) Prior Publication Data
US 2021/0284248 A1    Sep. 16, 2021

(30) Foreign Application Priority Data
Mar. 13, 2020 (JP) ................. 2020-044798

(51) Int. Cl.
*B62D 25/24* (2006.01)
*B62D 29/04* (2006.01)

(52) U.S. Cl.
CPC ........... *B62D 25/24* (2013.01); *B62D 29/041* (2013.01)

(58) Field of Classification Search
CPC .................................................. B62D 25/24
See application file for complete search history.

(56) References Cited

U.S. PATENT DOCUMENTS

| | | | |
|---|---|---|---|
| 4,588,105 A * | 5/1986 | Schmitz | F16J 13/14 220/359.4 |
| 5,267,667 A | 12/1993 | Cozzani | |
| 7,997,437 B2 * | 8/2011 | Jatzke | B62D 25/24 220/359.4 |
| 11,054,032 B2 * | 7/2021 | Chlystek | F16J 13/02 |
| 2007/0108216 A1 | 5/2007 | Kurth et al. | |

FOREIGN PATENT DOCUMENTS

| | | |
|---|---|---|
| JP | H05-248541 A | 9/1993 |
| JP | 2009-515098 A | 4/2009 |
| JP | 2011-012701 A | 1/2011 |
| JP | 2012-237381 A | 12/2012 |
| JP | 2014-145382 A | 8/2014 |

OTHER PUBLICATIONS

Nov. 21, 2023, Japanese Office Action issued for related JP Application No. 2020-044798.

* cited by examiner

*Primary Examiner* — James N Smalley
(74) *Attorney, Agent, or Firm* — Paratus Law Group, PLLC

(57) ABSTRACT

There is provided a hole plug including: a body portion including a cover flange portion that covers an opening, an insertion portion that is inserted into the opening, and at least one pair of engagement portions that is engaged with a back side peripheral edge of the opening; and a thermosoftening resin member that is fixed to a back side peripheral edge of the cover flange portion and that is configured to be heated and melted so as to fix the cover flange portion to a predetermined member. The thermosoftening resin member includes an extension portion extending obliquely outward toward the predetermined member, and the extension portion is elastically abutted against a front side of the predetermined member in a state where the engagement portion is engaged with the back side peripheral edge of the opening before melting of the thermosoftening resin member.

8 Claims, 18 Drawing Sheets

HOLE PLUG

CROSS-REFERENCE TO RELATED APPLICATIONS

This application is based on Japanese Patent Application No. 2020-044798 filed on Mar. 13, 2020, the contents of which are incorporated herein by way of reference.

TECHNICAL FIELD

The present invention relates to a hole plug configured to close an opening provided in a predetermined member.

BACKGROUND

In a member such as a body panel of an automobile, an opening that is used in a coating process, an assembling process, or the like may be formed. Such an opening is usually closed by a hole plug.

In related art, as a hole plug of this type, Patent Literature 1 below describes a hole plug which includes a plug body including a cover flange portion that covers an opening of a plate-shaped member, and an annular meltable member which is made of a thermosoftening resin and which is arranged between the plate-shaped member and the cover flange portion. The meltable member has a structure in which an extension portion protrudes from a side edge of a portion where a weld line is generated during resin molding. The plug body is provided with a locking portion which is engaged with a back side peripheral edge of the opening. The cover flange portion has a long plate shape whose both ends are rounded, and the meltable member which has a long annular shape is mounted on an outer periphery of the cover flange portion. Further, a strip-shaped extension portion extends outward from an outer side edge of a center of a long side of the meltable member so as to be parallel to a surface direction of the cover flange portion (see FIG. 3 of Patent Literature 1).

The plug body is inserted into the opening, the locking portion is engaged with the back side peripheral edge of the opening, the hole plug is temporarily fixed to the opening, and then the meltable member is heated and melted, such that the meltable member flows between the plate-shaped member and the cover flange portion and is cooled and solidified so as to finally fix the hole plug to the opening via the meltable member and close the opening.
Patent Literature 1: JP-A-2011-12701

However, a thickness of the member provided with the opening may vary depending on a vehicle type, use thereof, and the like. Therefore, there is a demand for responding to a change in the thickness of the member.

The strip-shaped extension portion of the hole plug of Patent Literature 1 extends in parallel to the surface direction of the cover flange portion, so that the extension portion is abutted against a front side of the plate-shaped member without being bent in the above-described temporarily fixed state. Therefore, for example, when the thickness is thinner than a predetermined plate thickness, the extension portion may not be abutted against the front side of the plate-shaped member, and thus looseness of the hole plug may occur.

Therefore, an object of the present invention is to provide a hole plug which can respond to the change in the thickness of the member and which can be stably attached to an opening while preventing looseness in a temporarily fixed state with respect to the opening.

SUMMARY

In order to achieve the above-described object, the present invention provides a hole plug configured to close an opening provided in a predetermined member, the hole plug including: a body portion including a cover flange portion that covers the opening, an insertion portion that extends from the cover flange portion and that is inserted into the opening, and at least one pair of engagement portions that is provided on the insertion portion and that is engaged with a back side peripheral edge of the opening: and a thermosoftening resin member that is fixed to a back side peripheral edge of the cover flange portion and that is configured to be heated and melted so as to fix the cover flange portion to the predetermined member. The thermosoftening resin member includes an extension portion extending obliquely outward toward the predetermined member, and the extension portion is elastically abutted against a front side of the predetermined member in a state where the engagement portion is engaged with the back side peripheral edge of the opening before melting of the thermosoftening resin member.

DESCRIPTION OF EMBODIMENTS

Hereinafter, an embodiment of a hole plug according to the present invention will be described with reference to the drawings.

Figure 1:
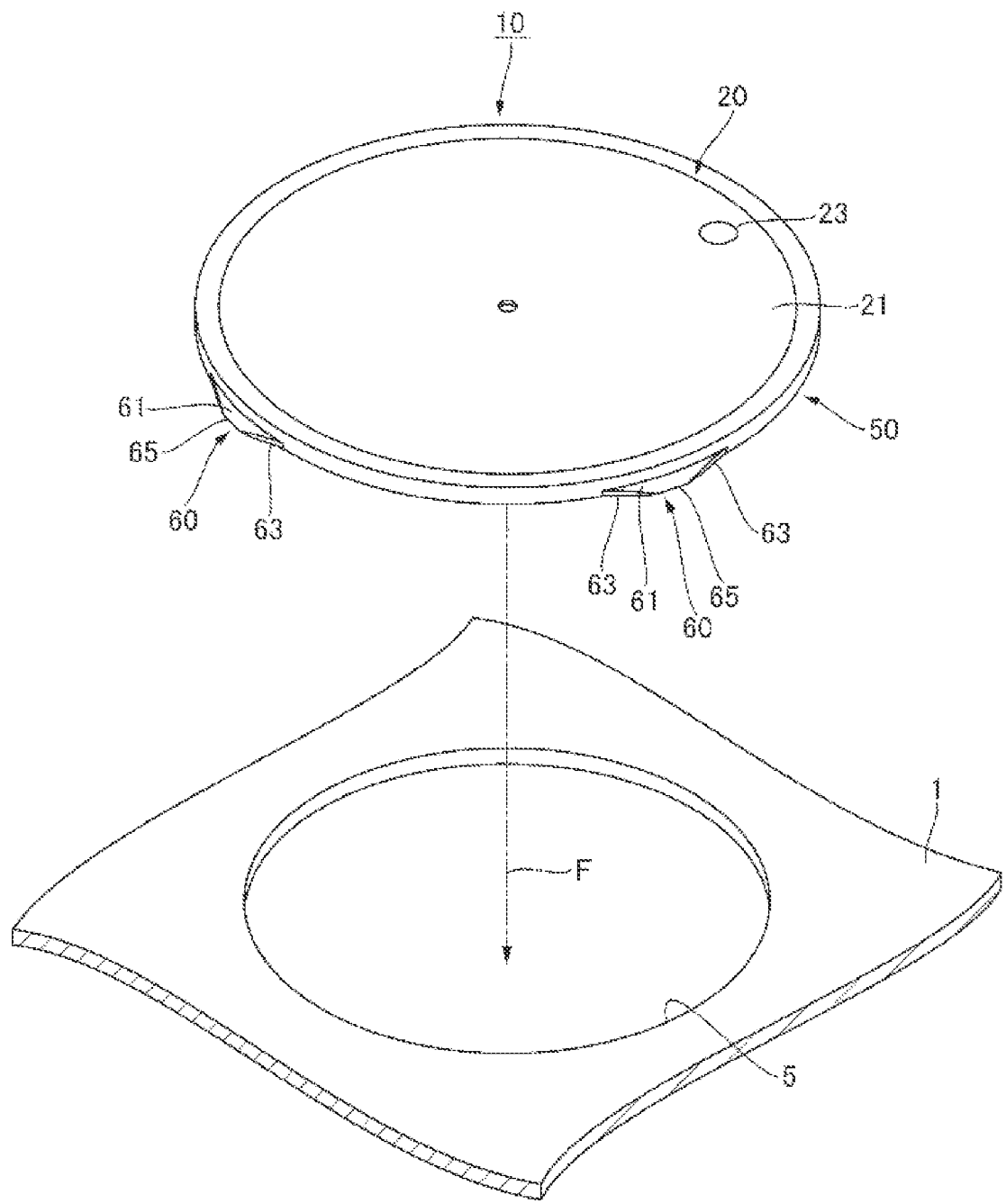
FIG. 1 is a perspective view showing an embodiment of a hole plug according to the present invention.

As shown in FIG. 1, a hole plug 10 is used, for example, to close an opening 5 provided in a predetermined member 1 such as a vehicle body panel of an automobile. Although the opening 5 has a circular shape in this embodiment, the opening 5 may also be a rectangular hole, an elliptical or oval long hole, or the like. The member 1 may be a lid of a luggage compartment of the automobile, a trunk lid, a door, a fender, or the like, and is not particularly limited.

Figure 2:
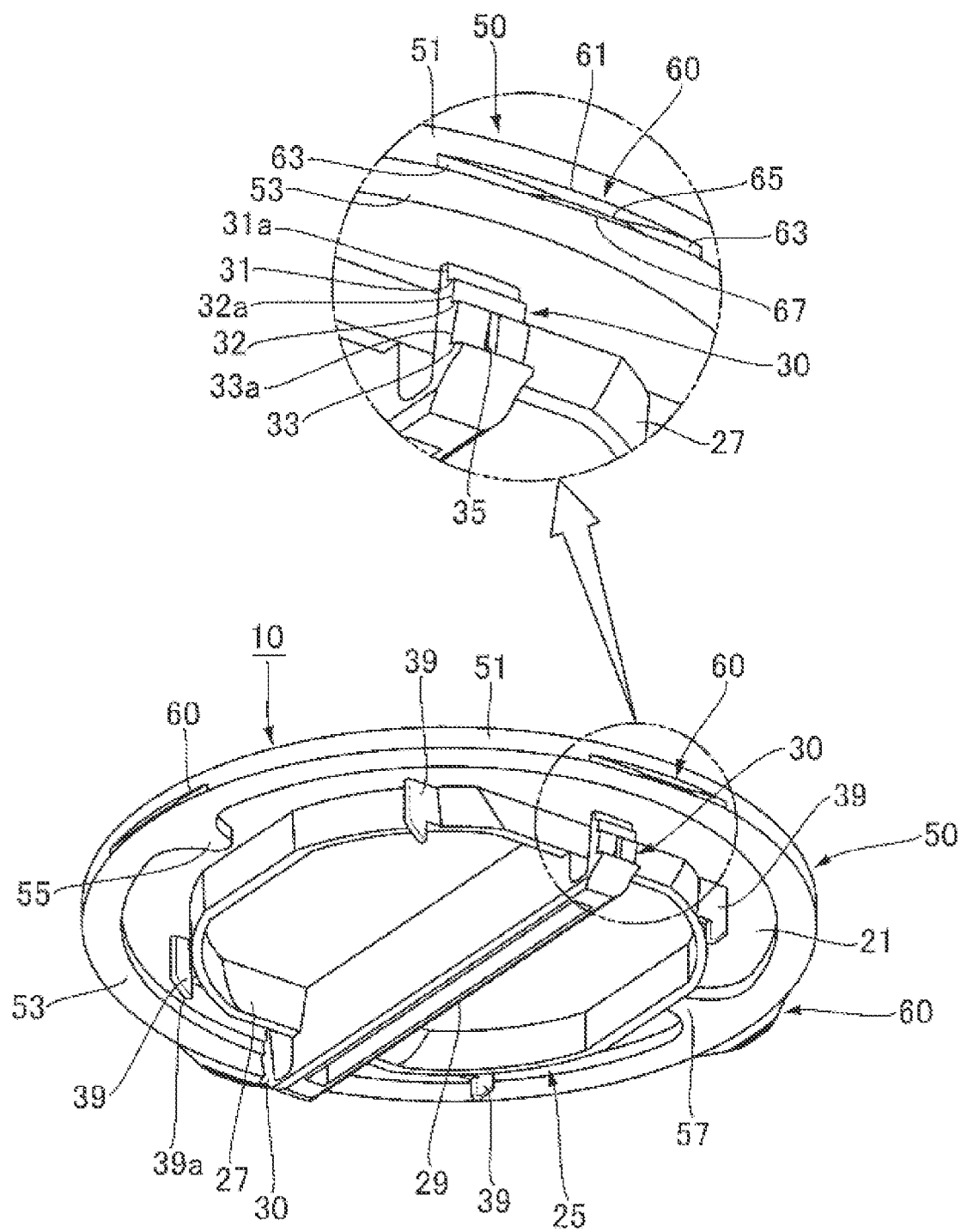
FIG. 2 is a perspective view of the hole plug as viewed from a direction different from that of FIG. 1.
Figure 5:
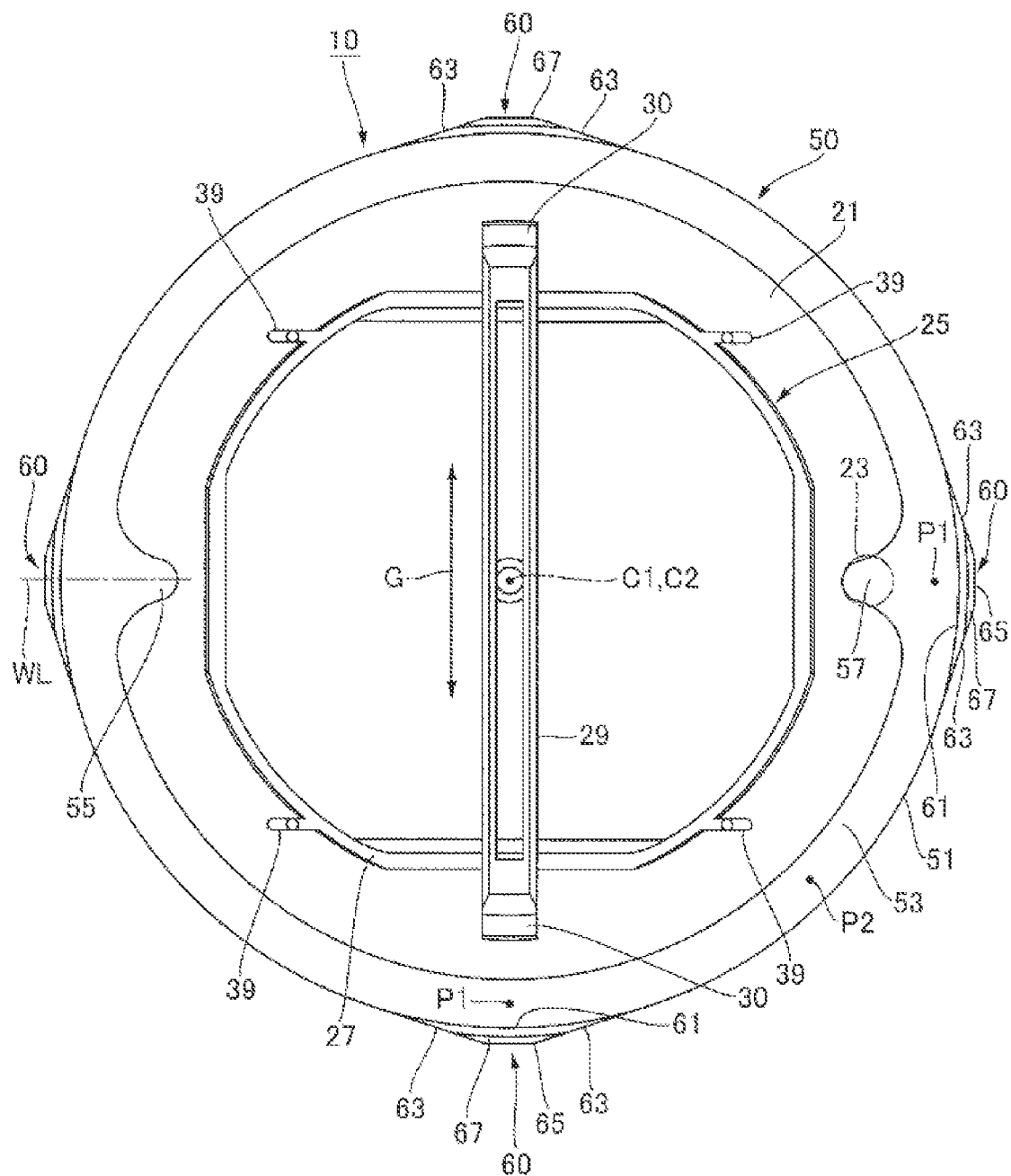
FIG. 5 is a bottom view of the hole plug.

As shown in FIGS. 2 and 5, the hole plug 10 (hereinafter, also simply referred to as the "plug 10") in this embodiment includes a body portion 20 and a thermosoftening resin member 50 (hereinafter, also simply referred to as the "resin member 50").

First, the body portion 20 will be described. The body portion 20 in this embodiment includes a cover flange portion 21 that covers the opening 5, an insertion portion 25 that extends from the cover flange portion 21 and that is inserted into the opening 5, and a pair of engagement portions 30, 30 that is provided on the insertion portion 25 and that is engaged with a back side peripheral edge of the opening 5.

Figure 4:
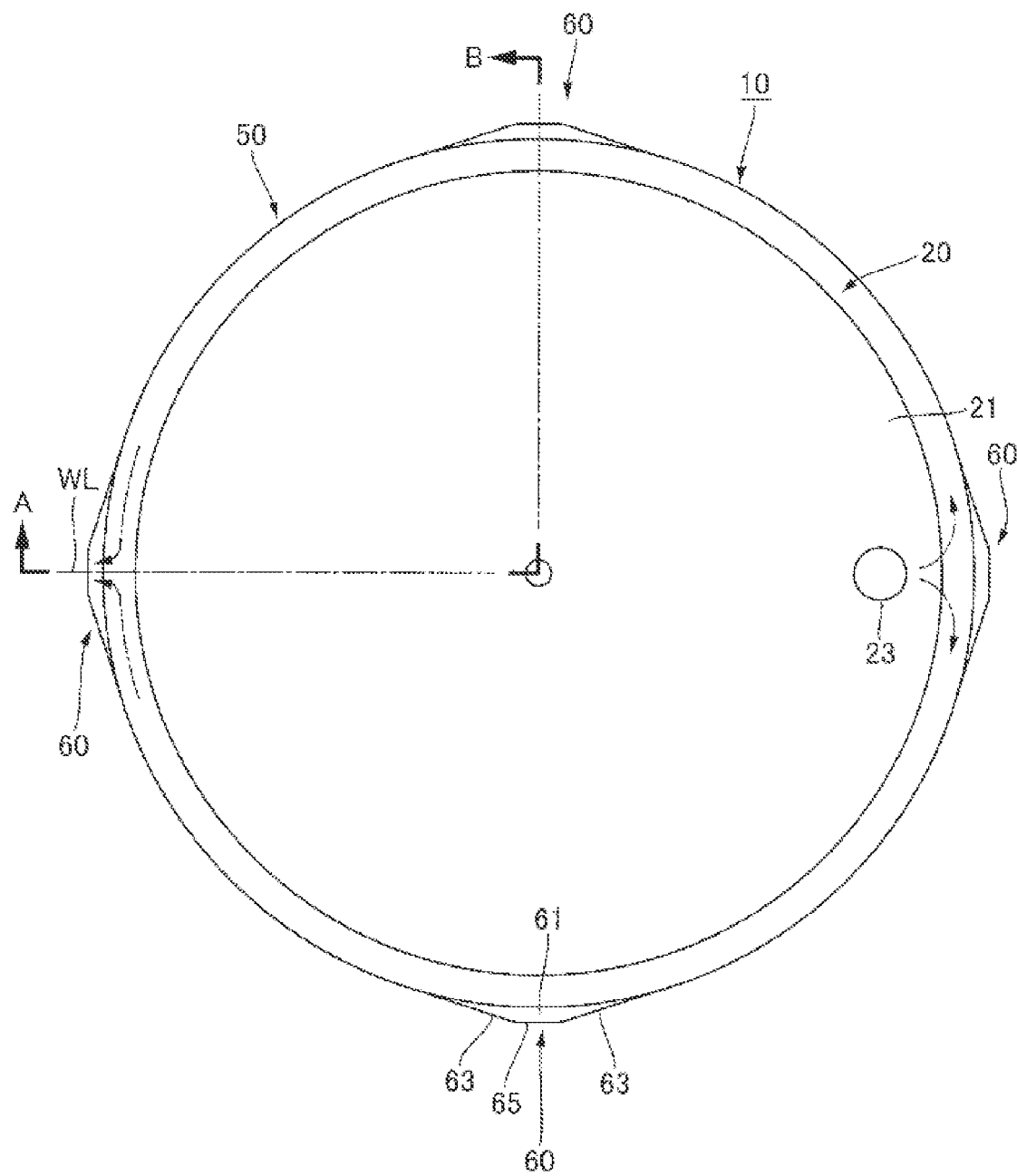
FIG. 4 is a plan view of the hole plug.
Figure 6:
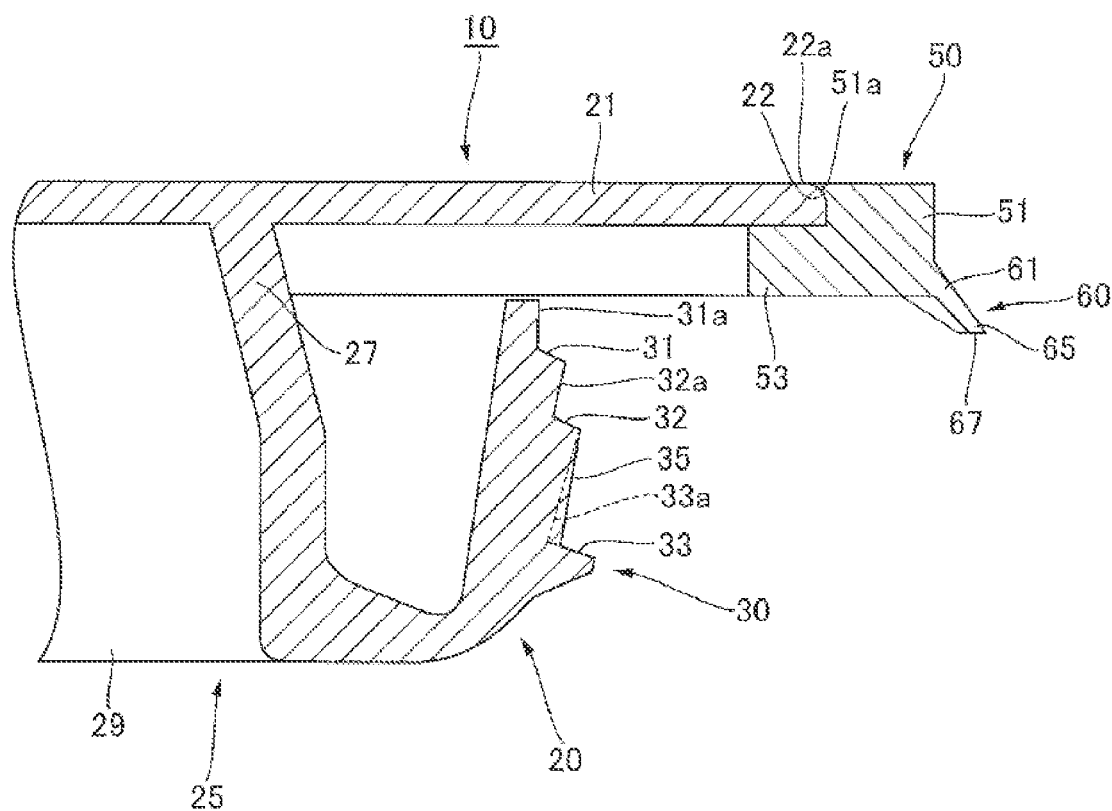
FIG. 6 is an enlarged sectional side view of a main part of the hole plug.
Figure 7:
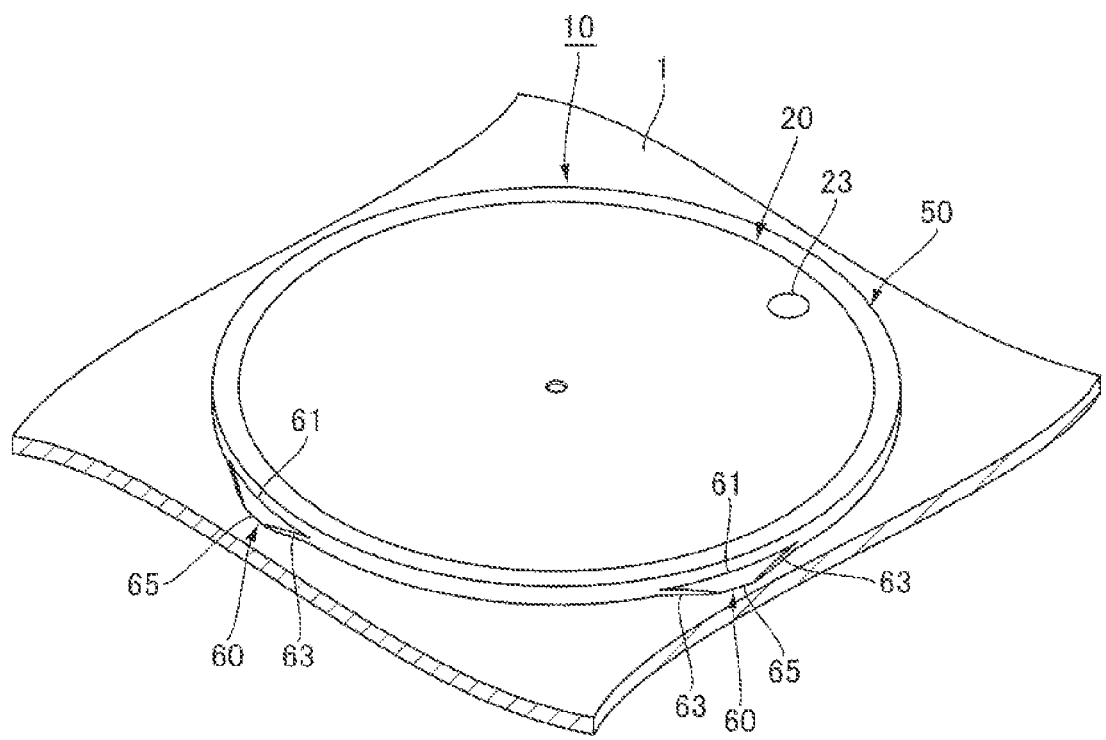
FIG. 7 is a perspective view showing a state (temporary fixed state) where the hole plug is attached to an opening.

As shown in FIG. 4, the cover flange portion 21 in this embodiment has a circular plate shape whose diameter is larger than that of the opening 5. As shown in FIG. 6, a curved surface portion 22 which has a curved surface shape with a predetermined curvature is formed on an outer peripheral edge portion of a front surface (definition thereof will be described later below) of the cover flange portion 21. A portion of the curved surface portion 22 that reaches the front surface of the cover flange portion 21 forms the outermost periphery 22a of the front surface of the cover flange portion 21. Further, a circular hole-shaped gate hole 23 used for injection-molding the resin member 50 is formed at the radial inside of the outer peripheral edge portion of the cover flange portion 21

As shown in FIGS. 2 and 5, the insertion portion 25 includes a frame-shaped wall 27 which extends from a back side of the cover flange portion 21 and which has a substantially octagonal frame shape. Further, predetermined wall portions of the frame-shaped wall 27 that face each other in a radial direction, are connected to each other by a connecting portion 29 that has a long frame shape extending across a radial direction center C1 of the cover flange portion 21. Rigidity of the frame-shaped wall 27 is improved by the connecting portion 29.

In FIG. 1, an insertion direction in which the insertion portion 25 of the plug 10 is inserted into the opening 5 is indicated by a reference sign "F". The "back side" of the cover flange portion 21 refers to a side facing the insertion direction F in which the insertion portion 25 is inserted into the opening 5. The same also applies to a "back side" of the predetermined member, the opening, or each portion (body portion, thermosoftening resin member, protruding portion, extension portion, and the like) of the plug in the following description. A "front side" of the predetermined member, the opening, or each portion of the hole plug refers to a side opposite to the "back side" described above. Further, the front surface of the cover flange portion 21 refers to a surface located on the front side. 5

Engagement portions 30 are respectively arranged on outer sides of both end portions of the connecting portion 29 in a long side direction. Each engagement portion 30 has an anchor shape that extends obliquely outward from the outer side of each of the both end portions of the connecting portion 29 in the long side direction toward the cover flange portion 21. That is, each engagement portion 30 has a cantilever shape in which a base end thereof is a fixed end connected to the connecting portion 29 while a tip end thereof in an extension direction is a free end. Although the pair of engagement portions 30, 30 is provided in this embodiment, for example, three engagement portions may be provided at predetermined intervals on an outer periphery of the frame-shaped wall 27, or two or more pairs of engagement portions 30, 30 may be provided, and there is no particular limitation.

As shown in FIGS. 2 and 6, an outer surface (a surface opposite to an inner surface facing a radial direction center C2 (see FIG. 5) of the insertion portion 25) of each engagement portion 30 has a plurality of steps. Here, a first step portion 31 is provided on the outer surface at a position closest to the cover flange portion 21, a second step portion 32 is provided on the outer surface at a position adjacent to the first step portion 31, and a third step portion 33 is provided on the outer surface at a position farthest from the cover flange portion 21. As shown in FIG. 6, insertion surfaces 31a, 32a, and 33a, which extend substantially along the extension direction of the engagement portion 30 and which are inserted on an inner periphery of the opening 5, are continuously provided on the respective step portions 31, 32, and 33.

Figure 8:
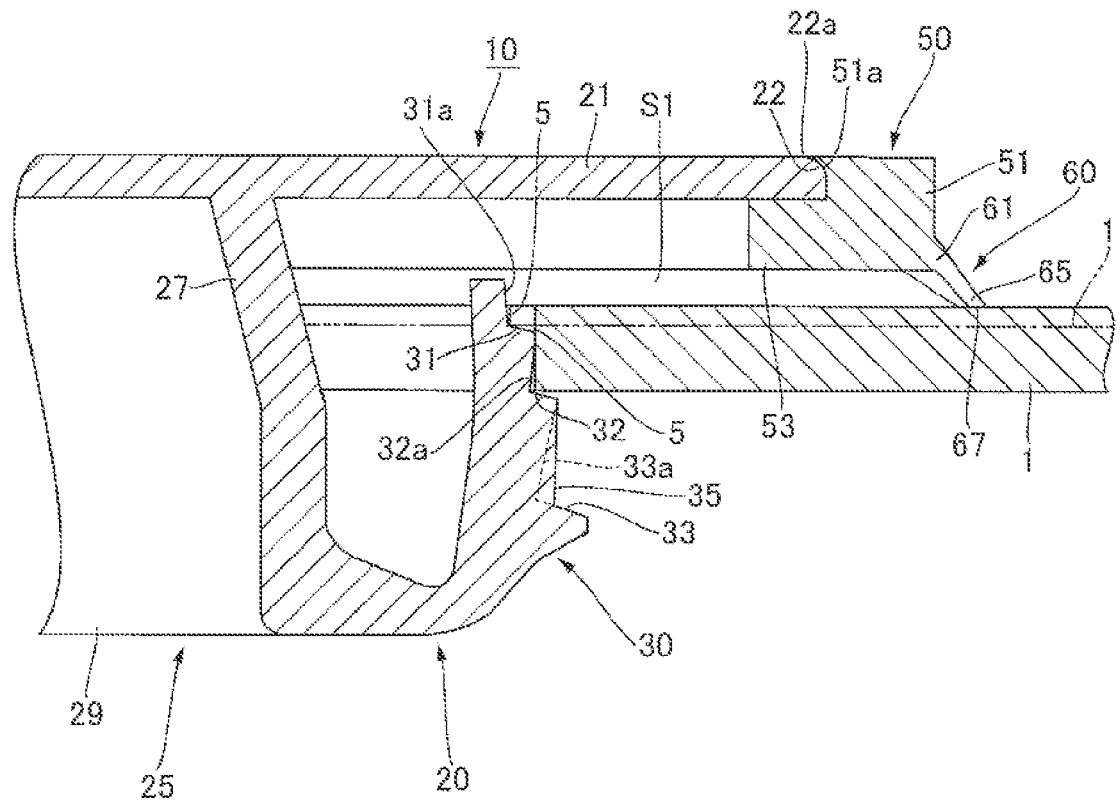
FIG. 8 is an enlarged sectional side view of the main part in a state shown in FIG. 7.
Figure 11:
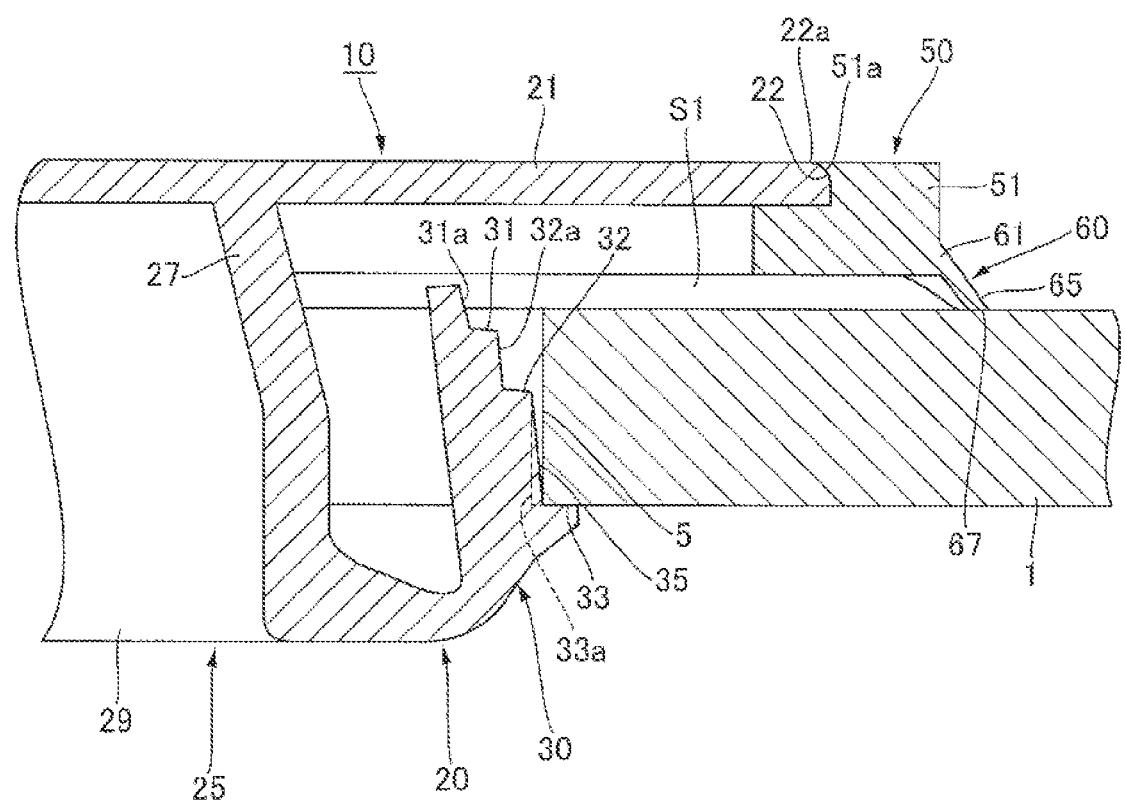
FIG. 11 is an enlarged sectional side view of the main part showing a state (temporary fixed state) where the hole plug is attached to an opening of a member thicker than the member shown in FIG. 7.

In a case where a thickness of the member 1 is thin, the insertion surface 31a is inserted on the inner periphery of the opening 5, and the first step portion 31 is engaged with the back side peripheral edge of the opening 5, as indicated by a two-dot chain line in FIG. 8. In a case where the thickness of the member 1 is thicker, as shown in FIG. 8, the insertion surface 32a is inserted on the inner periphery of the opening 5, and the second step portion 32 is engaged with the back side peripheral edge of the opening 5. In a case where the member 1 is further thicker, as shown in FIG. 11, the insertion surface 33a is inserted on the inner periphery of the opening 5, and the third step portion 33 is engaged with the back side peripheral edge of the opening 5. It should be noted that there may also be one or two step portions, or four or more step portions.

Figure 3:
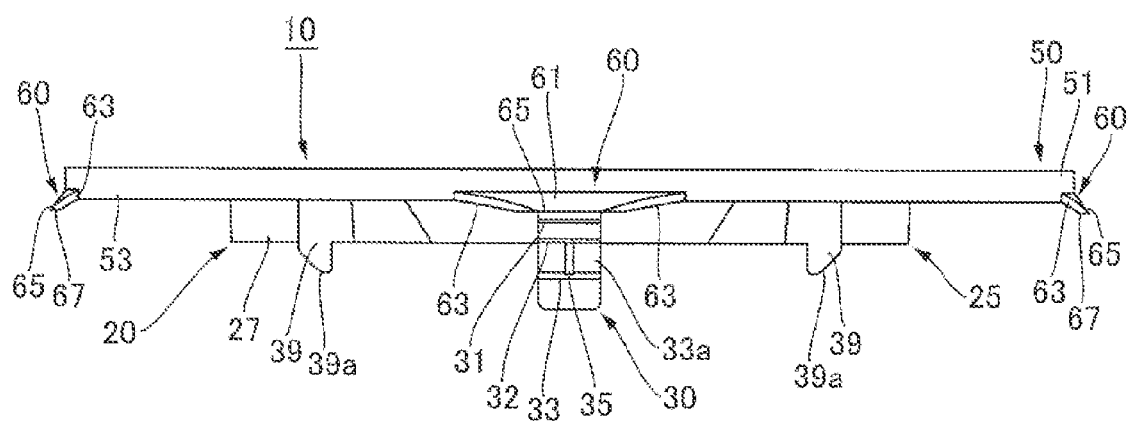
FIG. 3 is a front view of the hole plug.

Further, as shown in FIGS. 2 and 3, a rib 35 extending in the insertion direction in which the insertion portion 25 is inserted into the opening 5, is formed on an outer surface of the third step portion 33 which is located farthest from the cover flange portion 21 among the plurality of step portions. In this embodiment, the rib 35, which is a thin ridge extending with a constant width, is provided on a width direction center of the insertion surface 33a of the third step portion 33. As shown in FIG. 11, in the case where the thickness of the member 1 is thick, the rib 35 is pressed by the inner periphery of the opening 5 and crushed so as to bite into and engage with the inner periphery of the opening when the insertion portion 25 is inserted into the opening 5.

As shown in FIG. 5, when the insertion portion 25 is viewed in an axial direction, a pair of guide pieces 39, 39 is provided on the outer periphery of the frame-shaped wall 27 on both sides of each engagement portion 30 (a total of four guide pieces 39 are provided). As shown in FIG. 2, each guide piece 39 extends so as to protrude from a tip end of the frame-shaped wall 27, and a tapered surface 39a is formed on an outer surface of a tip end of the guide piece 39 in an extension direction thereof. When the insertion portion 25 is inserted into the opening 5, the guide pieces 39 abut against the inner periphery of the opening 5 and are guided and thus the insertability of the insertion portion 25 is improved. And the guide pieces 39 abut against the inner periphery of the opening 5 in a state where the insertion portion 25 is inserted into the opening 5 so as to prevent looseness in the radial direction of the plug 10 with respect to the opening 5.

The body portion 20 described above is made of a material having high heat resistance in consideration of heating and melting processes, and all portions (the cover flange portion 21, the insertion portion 25, the engagement portion 30, and the like) are integrally formed of a resin material having a melting temperature higher than a melting temperature of the thermosoftening resin member 50. Shapes of each portion (the cover flange portion, the insertion portion, the frame-shaped wall, the engagement portion, and the like) of the body portion are not particularly limited.

Next, the thermosoftening resin member 50 will be described. The resin member 50 is fixed to the back side peripheral edge of the cover flange portion 21 and is heated and melted so as to fix the cover flange portion 21 to the member 1.

The resin member 50 of this embodiment includes a peripheral wall portion 51 which has an annular shape surrounding an entire periphery of an outer periphery of the cover flange portion 21. An inner peripheral end portion 51a that covers the curved surface portion 22 of the cover flange portion 21 from an inner periphery of the peripheral wall portion 51 in the radial direction, is provided. Further, one end surface of the peripheral wall portion 51 is matched (to be flush with the front surface of the cover flange portion 21 including the inner peripheral end portion 51a) with the front surface of the cover flange portion 21 (which refers to a surface located on the front side, the same also applies hereinafter). The peripheral wall portion 51 protrudes from the back side of the cover flange portion 21 by a predetermined length. A receiving portion 53, which has a thin annular shape, protrudes from the protruding portion of the peripheral wall portion 51 toward an inner side of the cover flange portion 21 in the radial direction, and the back side of the cover flange portion 21 is received and supported by the receiving portion 53. The resin member 50 is formed by the peripheral wall portion 51 and the receiving portion 53 in a frame shape which has a substantially L-shaped cross section.

An inner periphery of the peripheral wall portion 51 of the resin member 50 is fixed to the outer periphery of the cover flange portion 21. An inner surface (which refers to a surface opposite to a surface facing the front side of the member 1) of the receiving portion 53 of the resin member 50 is also fixed to the back side of the cover flange portion 21. That is, the resin member 50 is fixed to the outer peripheral edge on the back side of the cover flange portion 21.

Further, as shown in FIG. 6, the inner peripheral end portion 51a of the resin member 50 covers the curved surface portion 22 of the cover flange portion 21 as described above, and is not provided at the inside of the outermost periphery 22a of the front surface of the cover flange portion 21 (at the inside of the cover flange portion 21 in the radial direction). Although one end surface of the peripheral wall portion 51 is flush with the front surface of the cover flange portion 21 in this embodiment, an outer wall portion may also protrude higher than the front surface of the cover flange portion. However, in this case, it is still preferable that the outer wall portion is not provided at the radial inside of the outermost periphery of the front side of the cover flange portion.

The resin member 50 can be formed by, for example, insert molding during which the body portion 20 is set in a molding frame (not shown) and then molten synthetic resin is injection-molded from the gate hole 23 provided in the cover flange portion 21, or two-color molding during which the body portion 20 and the resin member 50 are molded by injecting different types of molten synthetic resin into a molding frame that is partially or wholly common. At this time, as indicated by an arrow in FIG. 4, the molten resin injected from the gate hole 23 flows from the gate hole 23 into a cavity of the molding frame (not shown), and finally merges at a position radially opposite to the gate hole 23. Such a merging point forms a linear mark called a weld line WL.

The resin member 50 has an extension portion 60 extending obliquely outward toward the member 1. The extension portion 60 is configured to be elastically abutted against the front side of the member 1 in a state where the engagement portion 30 is engaged with the back side peripheral edge of the opening 5 before melting of the resin member 50 (hereinafter, also simply referred to as an "engagement-before-melting state"). In this embodiment, a plurality of the extension portions 60 are provided at predetermined intervals in a peripheral direction on an outer periphery of the resin member 50 (arrangement of the extension portions 60 will be described later below)

As shown in FIGS. 1 to 3, a base end 61 of each extension portion 60 is connected to a back side end portion (lower end portion in a thickness direction) of the peripheral wall portion 51 on an outer periphery of the peripheral wall portion 51 of the resin member 50. Each extension portion 60 extends obliquely outward toward the member 1 while both side portions 63 thereof are formed to gradually become narrower toward an tip end 65 in an extension direction (it can also be said that the both side portions 63 gradually become wider from the tip end 65 in the extension direction toward the base end 61 in the extension direction), and the extension portion 60 has a beak shape as a whole. Further, the tip end 65 which is located at a tip end of the extension portion 60 in the extension direction is formed to be narrower than the base end 61, and a back side thereof forms an abutment surface 67 which has a flat surface shape As shown in FIG. 6, a leading tip end of the extension portion 60 in the extension direction extends by a length that allows the extension portion 60 to be slightly closer to the base end side as compared with a leading tip end of the engagement portion 30 (here, the leading tip end of the extension portion in the extension direction extends with a length reaching the insertion surface 31a of the first step portion 31 which is closest to the cover flange portion 21). As a result, in the state where the engagement portion 30 is engaged with the back side peripheral edge of the opening 5 before the melting of the resin member 50, as shown in FIG. 8, the abutment surface 67 of the tip end 65 is pressed against the front side of the member 1, and the tip end 65 is elastically abutted against the front side of the member 1.

As shown in FIG. 8, in the plug 10, a gap S1 is provided between the resin member 50 and the member 1 (here, between the back side of the peripheral wall portion 51 and the receiving portion 53 of the resin member 50 and the front side of the member 1) in the engagement-before-melting state. The gap S1 is maintained even when the thickness of the member 1 varies (even when the member 1 is thick or thin).

Figure 9:
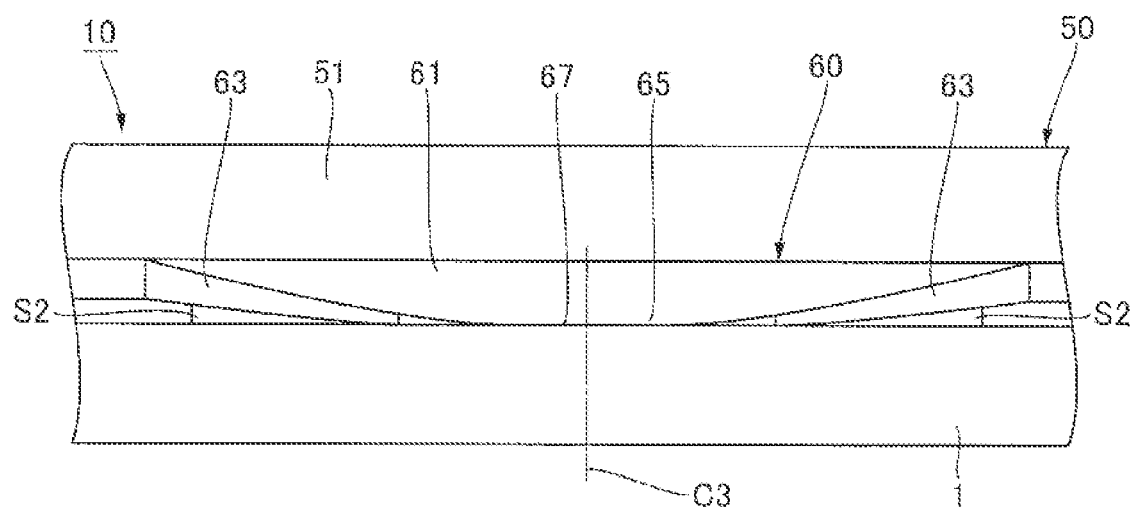
FIG. 9 is an enlarged front view of the main part in the state shown in FIG. 7.

Further, since the both side portions 63 of each extension portion 60 extending obliquely outward toward the member 1 are formed to become wider toward the base end 61 in the extension direction, as shown in FIG. 9, a gap S2 that gradually becomes narrower toward a peripheral direction center C3 of the extension portion 60 is formed between the back side of each side portion 63 of the extension portion 60 and the front side of the member 1 when the extension portion 60 is viewed from a front side (when viewed from a side opposite to the extension direction of the extension portion 60) in the engagement-before-melting state.

A shape of the extension portion may be, for example, a shape extending in a strip shape with a constant width, and it is necessary that the shape at least allows the extension portion to extend obliquely outward toward the member (it can be said that the shape extends obliquely outward toward the insertion direction F in which the insertion portion 25 is inserted into the opening 5).

As shown in FIG. 5, when viewed in an axial direction of the plug 10 (a direction along the insertion direction F of the insertion portion 25), the pair of extension portions 60, 60 is arranged to face each other in a direction orthogonal to a facing direction G of the pair of engagement portions 30, 30 on the outer periphery of the peripheral wall portion 51 of the resin member 50. And the other pair of extension portions 60, 60 is arranged in the direction along the facing direction G of the pair of engagement portions 30, 30 on the outer periphery of the peripheral wall portion 51. In other words, the plurality of (here, four) extension portions 60 are arranged at equal intervals on the outer periphery of the resin member 50.

Although the number and arrangement of the extension portions are not limited to those described above, as shown in FIG. 4, it is preferable that the extension portions are at least provided at positions corresponding to the weld line WL generated when the resin member 50 is injection-molded. It is also preferable that at least one pair of extension portions is provided as the extension portions, and the pair of extension portions is arranged to face each other in the direction orthogonal to the facing direction of the pair of engagement portions.

As shown in FIG. 5, the thermosoftening resin member 50 is provided with a weld line corresponding protruding portion 55 that protrudes inward at a position matching the extension portion 60 provided at the weld line corresponding position. Further, as shown in FIG. 5, the thermosoftening resin member 50 is provided with a gate hole corresponding protruding portion 57 that protrudes inward at a position matching the gate hole 23. The weld line corresponding protruding portion 55 serve as a "protruding portion" in the present invention. The weld line corresponding protruding portion 55 is hereinafter also simply referred to as the "protruding portion 55".

More specifically, the weld line corresponding protruding portion 55 protrudes toward the radial direction center C2 of the insertion portion 25 from a weld line corresponding position on an inner periphery of the receiving portion 53. On the other hand, the gate hole corresponding protruding portion 57 protrudes toward the radial direction center C2 of the insertion portion 25 from a position matching the gate hole 23 in a peripheral direction on the inner periphery of the receiving portion 53. The both protruding portions 55 and 57 are wider on a base end side in a protruding direction and gradually become narrower toward a tip end side in the protruding direction, while tip ends thereof are rounded. As shown in FIG. 5, a tip end of the gate hole corresponding protruding portion 57 in the protruding direction matches the gate hole 23.

Figure 10:
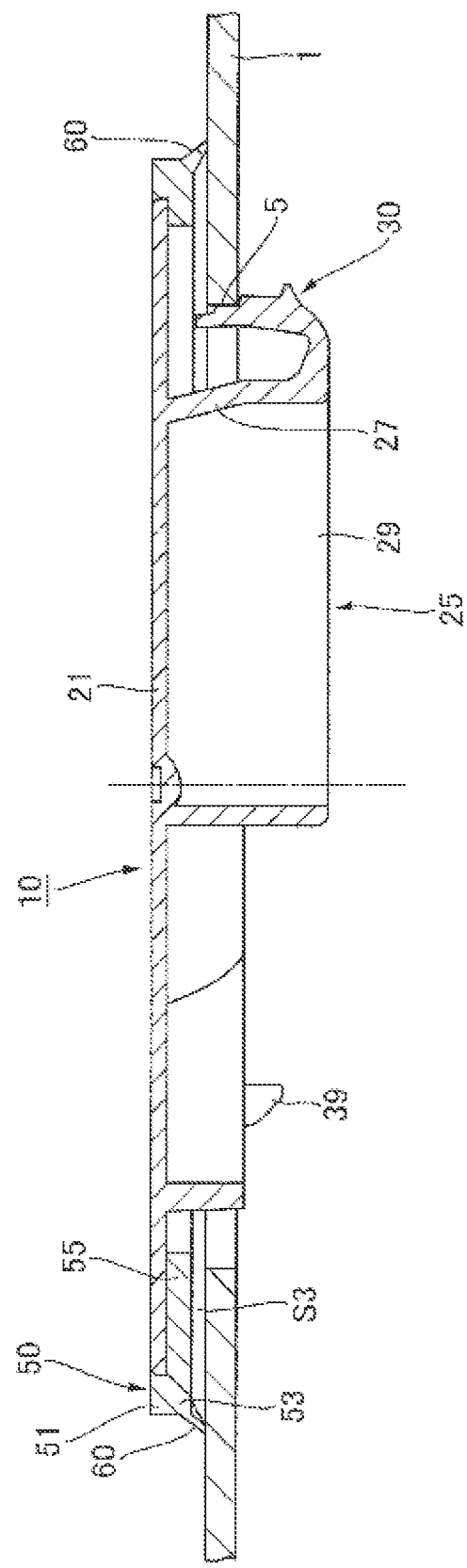
FIG. 10 is a cross-sectional explanatory view in a state where the hole plug taken along a line connecting arrows A and B in FIG. 4 is temporarily fixed to the opening.

The above-described weld line corresponding protruding portion 55 has the following relationship to the member 1. That is, as shown in FIG. 10, a gap S3 is provided between the protruding portion 55 and the member 1 (between the back side of the protruding portion 55 and the front side of the member 1) in the state where the engagement portion 30 is engaged with the back side peripheral edge of the opening 5 before the melting of the thermosoftening resin member 50. The gap S3 is maintained even when the thickness of the member 1 varies (even when the member 1 is thick or thin).

The thermosoftening resin member 50 described above is made of a material similar to that of a so-called hot melt adhesive, and exhibits an adhesive force when the thermosoftening resin member 50 is heated, melted and then cooled and solidified. As a material of the thermosoftening resin member 50, a thermoplastic resin which is softened by application of heat and solidified by cooling is used as a main component, and an adhesive resin or the like is added thereto. In this embodiment, as the thermosoftening resin member 50, a resin material obtained by adding a polyolefin-based adhesive resin to an ethylene-vinyl acetate copolymer (EVA) based resin, is used.

The thermosoftening resin member 50 preferably has a melting temperature of 60 to 100° C. When the melting temperature is lower than 60° C., re-melting may occur when temperature is high in summer or the like, which is not preferable. On the other hand, when the melting temperature is higher than 100° C., for example, the temperature must be set high at the time of heating and melting, resulting in an increase in manufacturing costs, which is also not preferable.

All portions of the thermosoftening resin member (the peripheral wall portion, the receiving portion, the protruding portion, the extension portion, and the like) are integrally formed. Shapes of each portion other than the extension portion of the thermosoftening resin member (the peripheral wall portion, the receiving portion, the protruding portion, and the like) are not particularly limited.

Next, a method of using the plug 10 configured as described above and effects thereof will be described.

As described above, the plug 10 is manufactured by setting the body portion 20 in the molding frame (not shown) and then injection-molding the molten synthetic resin from the gate hole 23 of the cover flange portion 21 such that the resin member 50 is fixed to the back side peripheral edge of the cover flange portion 21. That is, the body portion 20 and the resin member 50 are integrated by insert molding or two-color molding so as to manufacture the plug 10.

Then the insertion portion 25 of the plug 10 is inserted into the opening 5 from the front side of the member 1. When an outer periphery of each engagement portion 30 is pressed against the inner periphery of the opening 5 and bends inward while a base end side of the engagement portion 30 comes out of the opening 5, each engagement portion 30 elastically returns, and the predetermined step portion is engaged with the back side peripheral edge of the opening 5.

Here, as shown in FIG. 8, the insertion surface 32*a* is inserted on the inner periphery of the opening 5, and the second step portion 32 is engaged with the back side peripheral edge of the opening 5. In a case where the member 1 has a thinner thickness as compared with the member 1 indicated by a solid line in FIG. 8, as indicated by a two-dot chain line in FIG. 8, the insertion surface 31*a* is inserted on the inner periphery of the opening 5, and the first step portion 31 is engaged with the back side peripheral edge of the opening 5. Further, in a case where the member 1 has a thicker thickness as shown in FIG. 11 as compared with the member 1 indicated by the solid line in FIG. 8, the insertion surface 33*a* is inserted on the inner periphery of the opening 5, and the third step portion 33 is engaged with the back side peripheral edge of the opening 5. In this way, the step portions 31, 32, and 33 are engaged with the back side peripheral edge of the opening 5 in accordance with changes in the thickness of the member 1.

At the same time, the abutment surface 67 of the tip end 65 of each extension portion 60 is abutted against the front side of the member 1 and are pressed toward the front side of the member 1, so that each extension portion 60 is slightly bent and elastically abutted against the front side of the member 1. That is, the extension portion 60 is elastically abutted against the front side of the member 1 in the state where the engagement portion 30 is engaged with the back side peripheral edge of the opening 5 before the melting of the resin member 50 (engagement-before-melting state). Similarly, even in the case where the member 1 is thin as shown by the two-dot chain line in FIG. 8 or in the case where the member 1 is thick as shown in FIG. 11, the extension portion 60 is elastically abutted against the front side of the member 1 in the engagement-before-melting state.

As a result, the plug 10 is temporarily fixed to the opening 5 of the member 1 in a state where the cover flange portion 21 is lifted up with respect to the front side of the member 1 via the plurality of extension portions 60, and the opening 5 is closed by the cover flange portion 21. At this time, as shown in FIG. 8, the gap S1 is formed between the back side of the peripheral wall portion 51 and the receiving portion 53 of the resin member 50 and the front side of the member 1. As shown in FIG. 9, the gap S2 which gradually becomes narrower toward the peripheral direction center C3 of the extension portion 60 is formed between the back side of each side portion 63 of the extension portion 60 and the front side of the member 1. Further, the gap S3 is formed between the protruding portion 55 and the member 1 (see FIG. 10).

Figure 12:
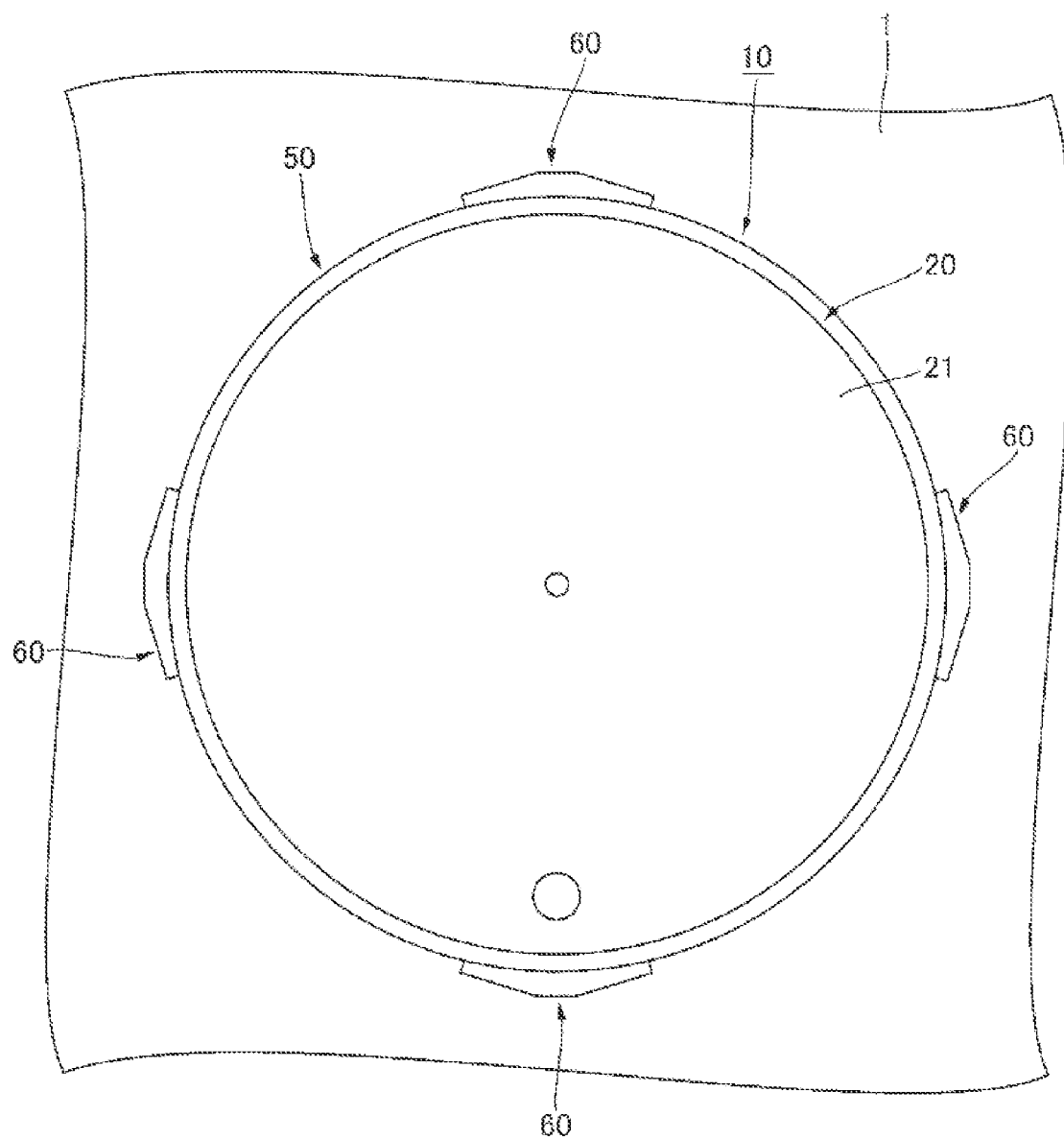
FIG. 12 is a perspective view when a thermosoftening resin member is heated from the state shown in FIG. 7.
Figure 13:
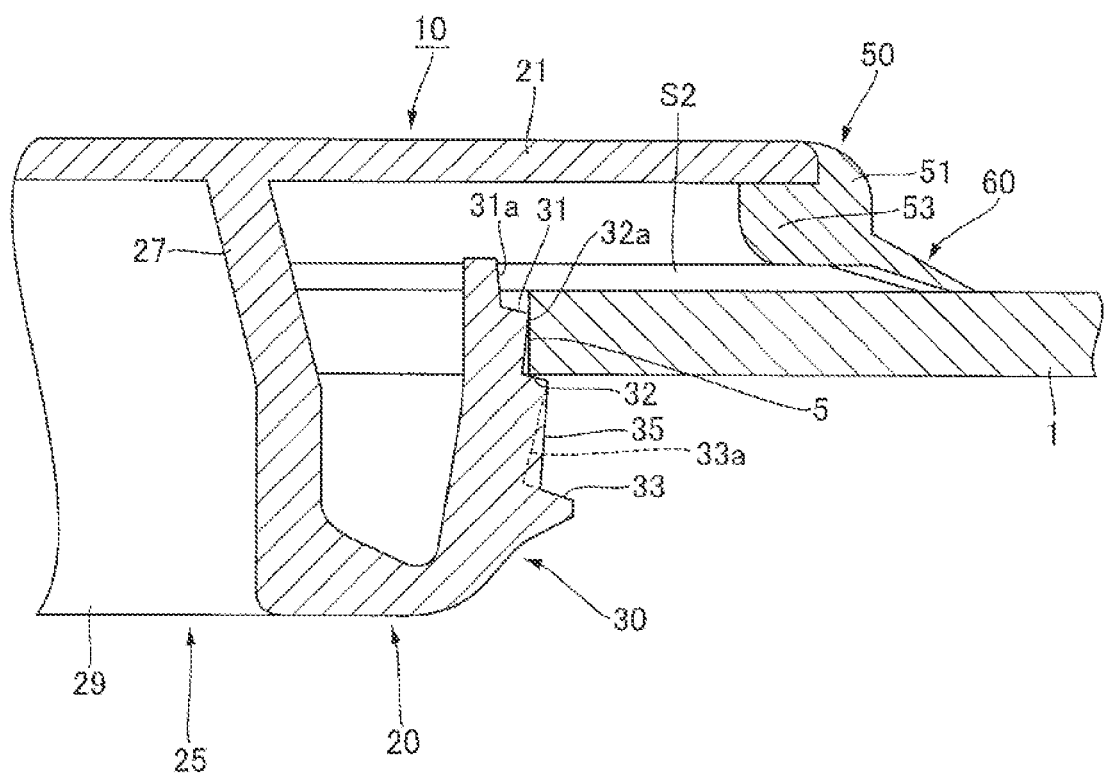
FIG. 13 is an enlarged sectional side view of the main part in a state shown in FIG. 12.

In this state, the resin member 50 is heated at a predetermined temperature for a predetermined time. As a result, as shown in FIG. 12, the both side portions 63, 63 of each extension portion 60 are heated, softened and deformed into a shape that becomes wider in the peripheral direction. As shown in FIG. 13, each extension portion 60 is deformed to fall down in a direction approaching the front side of the member 1. As shown in FIG. 13, the peripheral wall portion 51, the receiving portion 53, and the protruding portion 55 of the resin member 50 are also heated and softened, and are deformed so as to narrow the gap S1, the gap S2, and the gap S3 (deformed so as to hang down).

Figure 14:
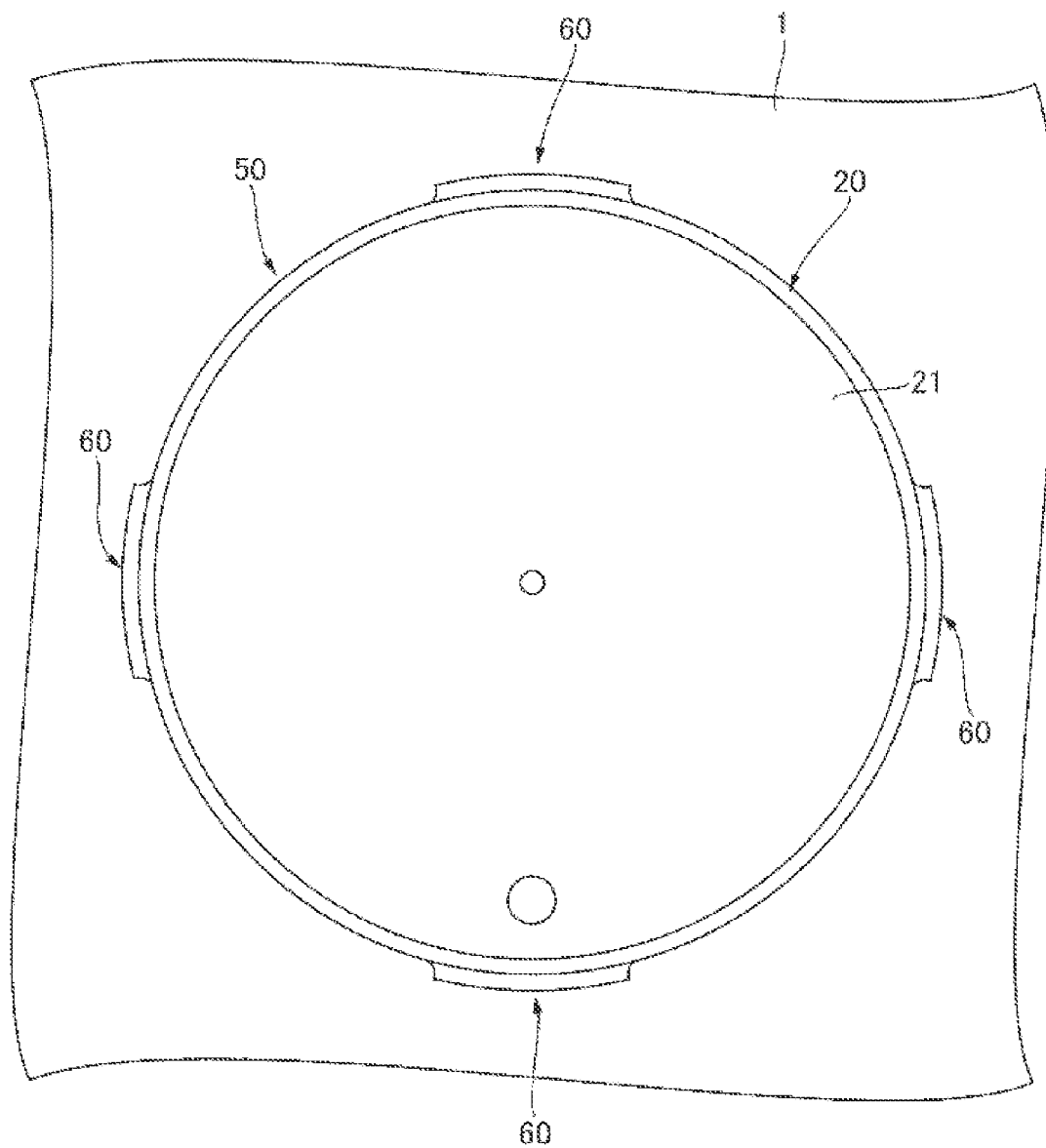
FIG. 14 is a perspective view showing a state (finally fixed state) where the thermosoftening resin member is further heated from the state shown in FIG. 12 to attach the hole plug to the opening.
Figure 15:
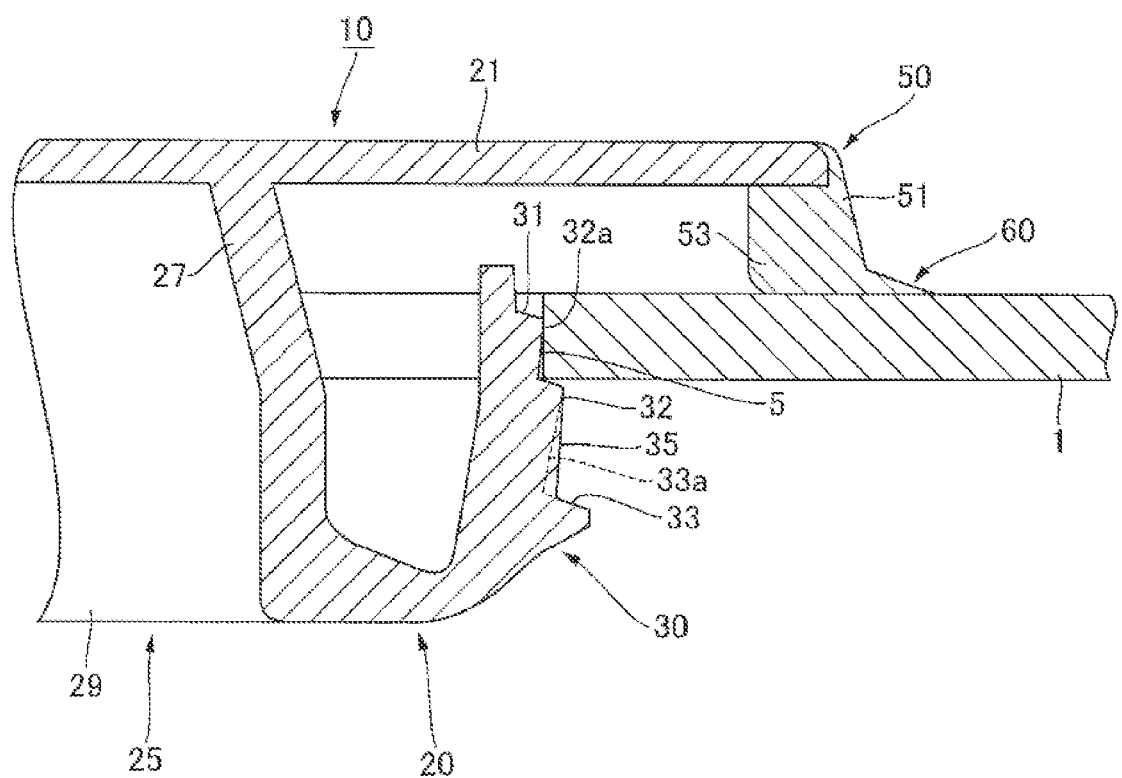
FIG. 15 is an enlarged sectional side view of the main part in a state shown in FIG. 14.

When the resin member 50 is further heated, as shown in FIG. 14, the both side portions 63, 63 of each extension portion 60 are heated and softened so as to be deformed into a strip shape having a substantially constant width along the peripheral direction. As shown in FIG. 15, each extension portion 60 is abutted against the front side of the member 1. As shown in FIG. 15, the peripheral wall portion 51, the receiving portion 53, and the protruding portion 55 of the resin member 50 are also further heated and softened, enters and fills the gap S1, the gap S2, and the gap S3, and are abutted against the front side of the member 1. As a result, the gap S1 and the gap S2 are sealed by the melted and deformed resin member 50. Thereafter, the resin member 50 is cooled and solidified so as to be fixed to the member 1, and the plug 10 is firmly fixed to the opening 5 via the resin member 50 (the plug 10 is finally fixed to the opening 5)

As described above, the resin member 50 is heated and melted in a state where the insertion portion 25 is inserted from the front side of the opening 5 of the member 1, the engagement portion 30 is engaged with the back side peripheral edge of the opening 5, and the extension portion 60 is elastically abutted against the front side of the member 1, so that the plug 10 can be attached to the opening 5 in a state where the cover flange portion 21 is fixed to the member 1, and the opening 5 is closed by the cover flange portion 21.

The resin member 50 of the plug 10 includes the extension portion 60 that extends obliquely outward toward the member 1. Even in the case where the member 1 has the thickness indicated by the solid line in FIG. 8, in the case where the member 1 is thin as indicated by the two-dot chain line in FIG. 8, or in the case where the member J is thick as shown in FIG. 11, the extension portion 60 is elastically abutted against the front side of the member 1 in the engagement-before-melting state, so that an application thickness of the member 1 can be increased (the members 1 having different thicknesses can be flexibly corresponded), and the plug 10 can be stably attached to the opening 5 while preventing looseness in the state where the plug 10 is temporarily fixed to the opening 5.

At this time, in this embodiment, since the outer surface of the engagement portion 30 has the plurality of steps, the stepped engagement portion at a predetermined position is appropriately engaged with the back side peripheral edge of the opening in accordance with the change in the thickness of the member. That is, in the case where the member 1 is thin, the first step portion 31 is engaged with the back side peripheral edge of the opening 5 as shown by the two-dot chain line in FIG. 8. In the case where the member 1 is thicker, the second step portion 32 is engaged with the back side peripheral edge of the opening 5 as shown in FIG. 8. In the case where the member 1 further is thicker, the third step portion 33 is engaged with the back side peripheral edge of the opening 5 as shown in FIG. 11, so that the change in the thickness of the member 1 can be flexibly corresponded.

Further, the rib 35 extending in the insertion direction F in which the insertion portion 25 is inserted into the opening 5 is formed on the outer surface of the step portion (third step portion 33) located farthest from the cover flange portion 21 among the plurality of step portions of the engagement portion 30. Therefore, as shown in FIG. 11, when the third step portion 33 is engaged with the back side peripheral edge of the opening 5, the rib 35 is crushed and engaged so as to bite into the inner periphery of the opening, so that the looseness of the plug 10 with respect to the opening 5 can be further prevented in the state where the plug 10 is temporarily fixed to the opening 5, and an attachment state thereof can be further stabilized.

In a case where the back side peripheral edge of the opening 5 is located between the second step portion 32 and the third step portion 33 in the state where the plug 10 is temporarily fixed to the opening 5, the rib 35 is engaged with the back side peripheral edge of the opening 5, so that the looseness of the plug 10 with respect to the opening 5 can be prevented. That is, the looseness of the plug 10 can be prevented within a range where the rib 35 extends, so that the change in the thickness of the member 1 can be more flexibly corresponded.

In this embodiment, at least one pair of extension portions 60 is provided, and at least one pair of extension portions 60, 60 faces each other in the direction orthogonal to the facing direction G of the pair of engagement portions 30, 30.

In this aspect, the following effects are obtained. That is, when the pair of extension portions 60, 60 does not exist in the direction orthogonal to the facing direction G of the pair of engagement portions 30, 30 in the cover flange portion 21, the cover flange portion 21 may be inclined with respect to the member 1. In particular, the cover flange portion 21 is most likely to be inclined in the direction orthogonal to the facing direction G of the pair of engagement portions 30, 30.

On the other hand, since the pair of extension portions 60, 60 is arranged to face each other in the direction orthogonal to the facing direction G of the pair of engagement portions 30, 30 in the present embodiment, the pair of extension portions 60, 60 is abutted against the front side of the member 1, so that the cover flange portion 21 is less likely to be inclined, and thus the plug 10 can be attached with less looseness with respect to the opening 5 in the state where the plug 10 is temporarily fixed to the opening 5.

Further, as shown in FIG. 6 in this embodiment, the resin member 50 is fixed to the outer peripheral edge on the back side of the cover flange portion 21, and is not provided at the inside of the outermost periphery of the front surface of the cover flange portion 21. Further, as shown in FIG. 8, the gap S1 is provided between the resin member 50 and the member 1 in the engagement-before-melting state.

According to this aspect, since the resin member 50 is not provided at the inside of the outermost periphery of the front surface of the cover flange portion 21, the melted resin member 50 is less likely to remain on the front surface of the cover flange portion 21 when the resin member 50 is heated and melted. Even when the thickness of the member 1 is thick or thin, the extension portion 60 can be elastically abutted against the front side of the opening 5 in the engagement-before-melting state due to the gap S1 provided between the resin member 50 and the member 1, so that the change in the thickness of the member 1 can be corresponded flexibly, and thus an application range of the thickness of the member 1 can be expanded. At the same time, since the resin member 50 is fixed to the outer peripheral edge on the back side of the cover flange portion 21, a volume of the resin member 50 can be increased. When the resin member 50 is heated and melted, the portions (here, the peripheral wall portion 51 and the receiving portion 53) fixed to the outer peripheral edge on the back side of the cover flange portion 21 enter and fill the gap S1 between the resin member 50 and the member 1, so that sealing performance between the back side of the cover flange portion 21 and the front side of the member 1 is improved, and thus the plug 10 can be attached to the opening 5 while the looseness is further prevented.

In this embodiment, the tip ends 65 of the plurality of extension portions 60, which are elastically abutted against the front side of the member 1, are respectively abutted against the front side of the member 1, so that the predetermined gap is formed between the back side of the receiving portion 53 of the resin member 50 and the front side of the member 1. At this time, as shown in FIG. 5, a gap between the back side of the receiving portion 53 and the front side of the member 1 at a position P1 corresponding to the predetermined extension portion 60, is larger than a gap between the back side of the receiving portion 53 and the front side of the member 1 at a peripheral direction intermediate position P2 between the extension portions 60, 60 which are adjacent to each other in the peripheral direction.

In response to this, as described above, the both side portions 63 of the extension portion 60 according to the present embodiment are formed to become wider toward the base end 61 in the extension direction, so that the gap S2 that gradually becomes narrower toward the peripheral direction center C3 of the extension portion 60 is formed between the back side of each side portion 63 of the extension portion 60 and the front side of the member 1 in the engagement-before-melting state as shown in FIG. 9. As a result, when the resin member 50 is heated and melted, a large gap (a gap between the back side of the receiving portion 53 corresponding to a position where the extension portion 60 is provided and the front side of the member 1) generated when the extension portion 60 is melted and elastically abutted against the front side of the member 1 can be filled, the sealing performance between the back side of the cover flange portion 21 and the front side of the member 1 can be further improved, and thus the plug 10 can be attached to the opening 5 while the looseness is further prevented.

As shown in FIGS. 4 and 5, in this embodiment, the extension portion 60 is provided at the position corresponding to the weld line WL generated when the resin member 50 is injection-molded. The resin member 50 is provided with the protruding portion 55 which protrudes inward at the position matching the extension portion 60 provided at the weld line corresponding position. The gap S3 is provided between the protruding portion 55 and the member 1 in the state where the engagement portion 30 is engaged with the back side peripheral edge of the opening 5 before the melting of the resin member 50 (see FIG. 10).

According to the above aspect, the extension portion 60 is provided at the position corresponding to the weld line WL generated when the resin member 50 is injection-molded, and the resin member 50 is provided with the protruding portion 55 which protrudes inward at the position matching the extension portion 60 provided at the weld line corresponding position, so that defects such as sink marks that are likely to occur in the weld line WL can be less likely to occur after the injection molding of the resin member 50 is completed (in a state where the resin material is melted and then solidified). Since the gap S3 is provided between the protruding portion 55 and the member 1 in the state where the engagement portion 30 is engaged with the back side peripheral edge of the opening 5 before the melting of the resin member 50, and since the protruding portion 55 is arranged on the back side of the cover flange portion 21, an area in which the cover flange portion 21 and the resin member 50 can abut against each other can be increased by an amount corresponding to the protruding portion 55, and thus it can become difficult for the resin member 50 to come off the cover flange portion 21. Even when the thickness of the member 1 is thick or thin, the extension portion 60 can be elastically abutted against the front side of the opening 5 in the engagement-before-melting state due to the gap S3 provided between the resin member 50 and the member 1, so that the change in the thickness of the member 1 can be corresponded flexibly, and thus the application range of the thickness of the member 1 can be expanded.

Further, in this embodiment, the gate hole 23 used for molding the resin member is formed in the radial direction inner side of the cover flange portion 21. The extension portion 60 is at least provided at the position facing the gate hole 23 in the radial direction at the position corresponding to the weld line WL at the time of molding the resin member. The resin member 50 is provided with the weld line corresponding protruding portion 55 which protrudes inward at position matching the extension portion 60 provided at the weld line corresponding position and the gate hole corresponding protruding portion 57 which protrudes inward at the position matching the gate hole 23, respectively.

According to the above aspect, since the gate hole 23 used for injection-molding the resin member 50 is formed in the radial direction inner side of the cover flange portion 21, cracking, breakage, or the like of the cover flange portion 21 can be prevented (in a case where a gate hole forming portion is locally provided on a radial direction outer peripheral edge of the cover flange portion 21, cracking or breakage is likely to occur in such a portion). Since the gate hole corresponding protruding portion 57 is also provided at the position matching the gate hole 23 in addition to the weld line corresponding protruding portion 55 provided at the position matching the extension portion 60 provided at the weld line corresponding position of the resin member 50, defects such as sink marks which occur after the injection molding of the resin member 50 is completed can be less likely to occur. Further, since the gate hole corresponding protruding portion 57 is provided in addition to the weld line corresponding protruding portion 55, the area in which the cover flange portion 21 and the resin member 50 can abut against each other can be increased, and thus the resin member 50 can be less likely to come off the cover flange portion 21.

Figure 16:
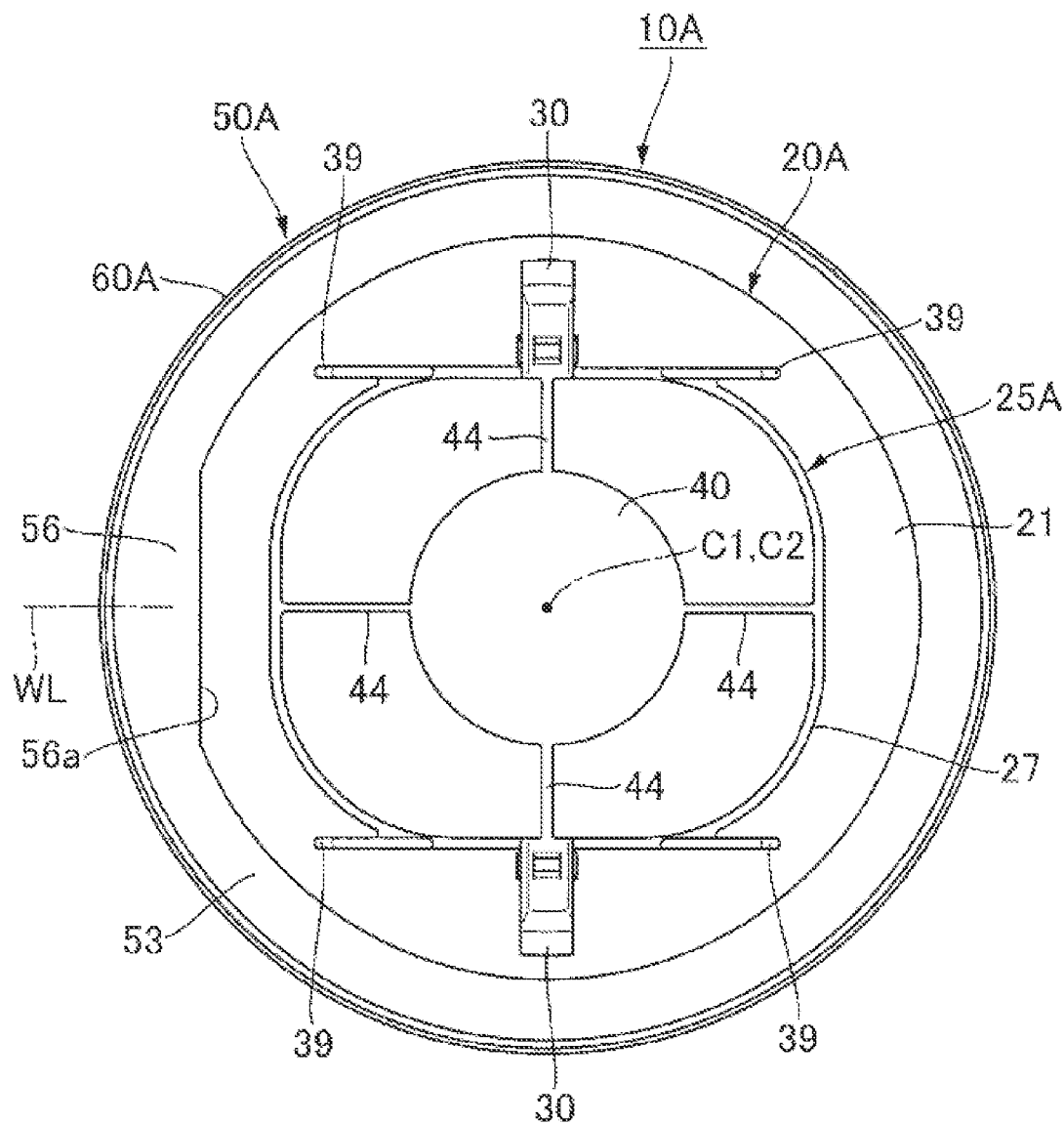
FIG. 16 is a bottom view showing other embodiment of the hole plug according to the present invention.
Figure 17:
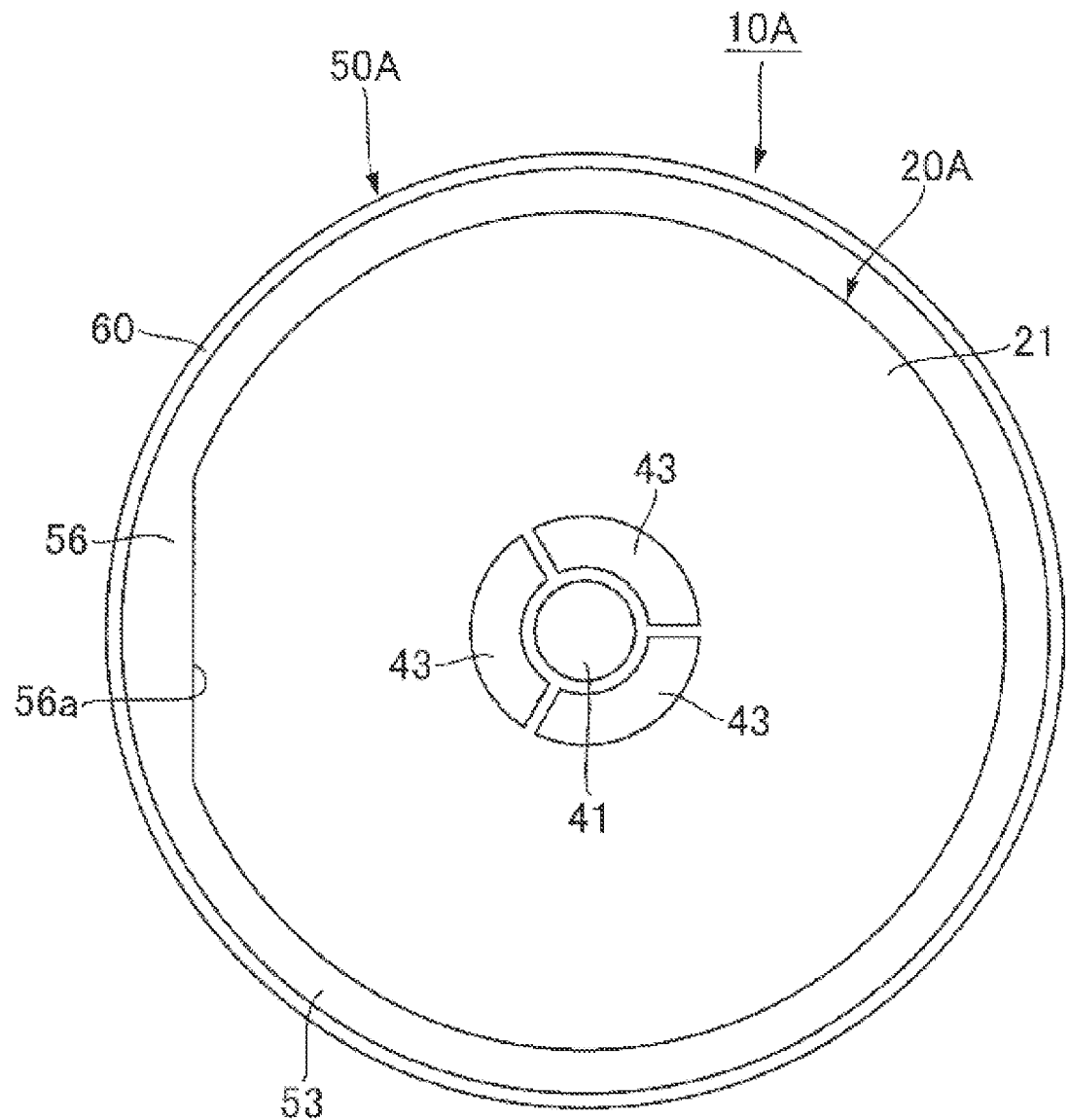
FIG. 17 is a plan view of the hole plug.
Figure 18:
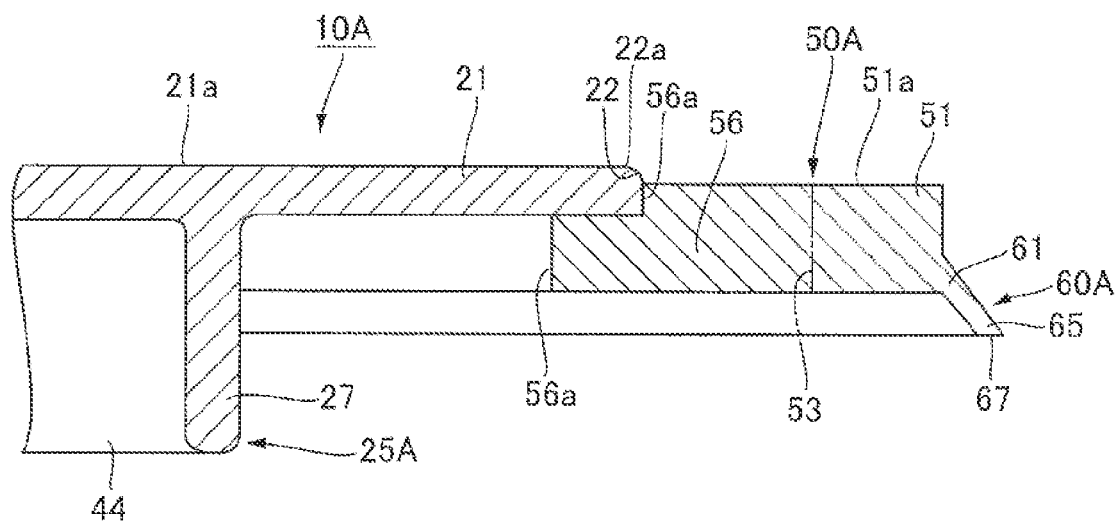
FIG. 18 is an enlarged sectional view of a main part of the hole plug.

FIGS. 16 to 18 show other embodiment of the hole plug according to the present invention. It should be noted that substantially the same parts as those in the above-described embodiment are denoted by the same reference signs, and description thereof will be omitted.

A hole plug 10A (hereinafter, also simply referred to as the "plug 10A") of the this embodiment includes a body portion 20A and a thermosoftening resin member 50A (hereinafter, also simply referred to as the "resin member 50A").

As shown in FIG. 16, an insertion portion 25A of the body portion 20A includes a holding cylinder portion 40 that is arranged on an inner side of the frame-shaped wall 27, that protrudes from a back side center of the cover flange portion 21, and that has a substantially cylindrical shape. A plurality of holding holes are formed at positions corresponding to the holding cylinder portion 40. That is, as shown in FIG. 17, a circular holding hole 41 having a predetermined depth is formed in a front side center of the cover flange portion 21 of the body portion 20A, and a plurality of holding holes 43 are formed substantially in a fan shape in an outer periphery of the holding hole 41. When the body portion 20A is held in a molding frame (not shown) in order to injection-mold the resin member 50A in the body portion 20A by insert molding or the like, holding pins or the like (not shown) are inserted into the plurality of holding holes 41 and 43 to firmly hold the body portion 20A, thereby improving production efficiency. As shown in FIG. 16, an outer periphery of the holding portion 40 and an inner periphery of the frame-shaped wall 27 are connected by a plurality of connecting ribs 44 to improve rigidity of the holding cylinder portion 40.

As shown in FIG. 18, an extension portion 60A extending obliquely from an outer periphery of the resin member 50A toward the member 1 is provided. As shown in FIG. 17, unlike the extension portion 60 of the above-described embodiment, an extension portion 60A of this embodiment is provided on the entire outer periphery of the resin member 50A. Here, the extension portion 60A is formed in a substantially annular shape provided over the entire periphery of the peripheral wall portion 51 from the back side end portion (the lower end portion in the thickness direction) on the outer periphery of the peripheral wall portion 51 of the resin member 50A.

Further, as shown in FIG. 16, on the resin member 50A, a weld line corresponding protruding portion 56 (hereinafter, also simply referred to as the "protruding portion 56") protrudes inward from a position that matches a portion provided at the weld line corresponding position on a predetermined portion of the extension portion 60A in the peripheral direction. The protruding portion 56 of this embodiment protrudes from the weld line corresponding position on the inner periphery of the receiving portion 53 toward the radial direction center C2 of the insertion portion 25A. An end surface 56a thereof in the protruding direction has a linear shape orthogonal to the weld line WL (has a flat surface shape cut orthogonal to the weld line WL). As shown in FIG. 18, the protruding portion 56 has a stepped shape in a thickness direction of the resin member 50A. A protruding amount of a protruding portion closer to the front side of the resin member 50A is less than that of a protruding portion closer to the back side of the resin member 50A. An area of the protruding portion 56 is larger than that of the protruding portion 55 in the above-described embodiment.

As shown in FIG. 18, the cover flange portion 21 is provided in such a manner that an upper end surface 21a of the cover flange portion 21 of the body portion 20A is higher as compared with an upper end surface 51a of the peripheral wall portion 51 of the resin member 50A.

The resin member 50A in this embodiment is fixed to the outer peripheral edge on the back side of the cover flange portion 21, and is not provided at the inside of the outermost periphery 22a of the front surface of the cover flange portion 21 (see FIG. 18). Further, although not particularly shown, a gap is provided between the resin member 50A and the member 1 in a state where the engagement portion 30 is engaged with the back side peripheral edge of the opening 5 before melting of the resin member 50A.

As shown in FIG. 16, the extension portion 60A provided on the entire outer periphery of the resin member 50A is provided at the position corresponding to the weld line WL generated when the resin member 50A is injection-molded. The protruding portion 56 protrudes toward an inner side of the extension portion 60A at a position matching the extension portion 60A provided at the weld line corresponding position. Further, although not particularly shown, a gap is provided between the protruding portion 56 and the member 1 in the state where the engagement portion 30 is engaged with the back side peripheral edge of the opening 5 before the melting of the resin member 50A.

In this embodiment, as described above, the extension portion 60A is provided on the entire outer periphery of the resin member 50A. Therefore, when the insertion portion 25A of the plug 10A is inserted into the opening 5 from the front side of the member 1, the engagement portions 30 are engaged with the back side peripheral edge the opening 5, the substantially annular-shaped extension portion 60A is abutted against the front side of the member 1 when the plug 10A is temporarily fixed to the opening 5 of the member 1, so that the plug 10A can be temporarily fixed in a stable posture without being inclined. When the resin member 50A is heated and softened, and the peripheral wall portion 51, the receiving portion 53, and the like are deformed, the peripheral wall portion 51 and the receiving portion 53 can be prevented from spreading outward by the extension portion 60A having the substantially annular shape, and can thus be firmly fixed to the member 1.

As described above, the end surface 56a of the protruding portion 56 in the protruding direction has the linear shape orthogonal to the weld line WL, and the area thereof is larger than that of the protruding portion 55 in the above-described embodiment. Therefore, at the time of injection molding of the resin member 50A, when the resin material is melted, the melted resin material is less likely to flow toward an inner side of the resin member 50A, sink marks or the like are less likely to occur in the protruding portions 56, and thus the protruding portions 56 can be obtained with good quality and less dimensional errors. The area in which the resin member 50A can be abutted against the cover flange portion 21 is further increased by the protruding portion 56 whose area is larger than that of the protruding portions 55, and thus the resin member 50A can be less likely to come off from the cover flange portion 21.

Figure 19:
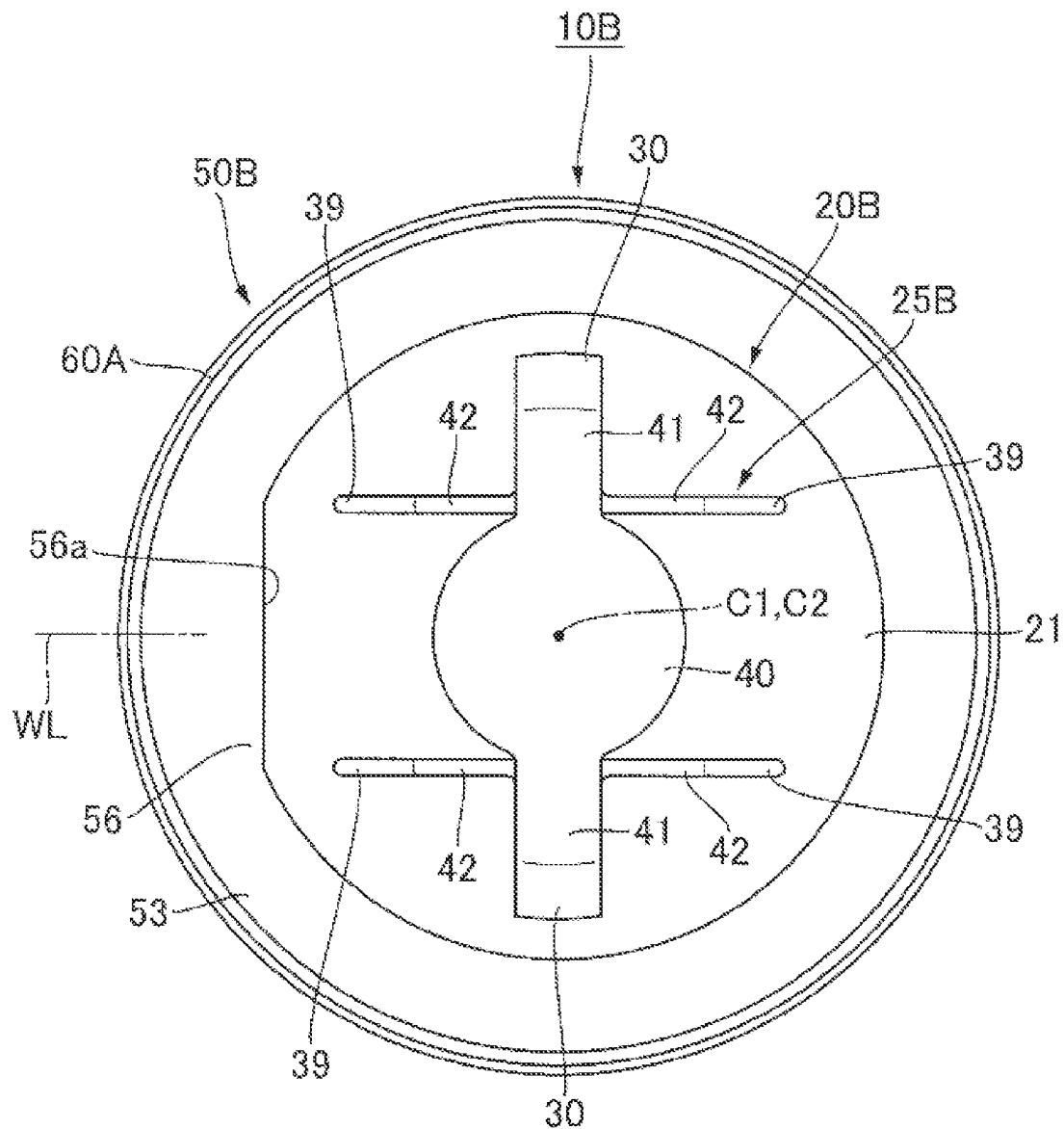
FIG. 19 is a bottom view showing other embodiment of the hole plug according to the present invention.

FIG. 19 shows other embodiment of the hole plug according to the present invention.

A hole plug 10B (hereinafter, also simply referred to as the "plug 10B") of this embodiment includes a body portion 20B and a thermosoftening resin member 50B (hereinafter, also simply referred to as the "resin member 50B").

Similarly to the embodiment shown in FIGS. 16 to 18, an insertion portion 25B of the body portion 20B of this embodiment includes the holding cylinder portion 40 which is substantially cylindrical, a pair of extension portions 41, 41 extending from two locations facing each other in the radial direction on an outer periphery of the holding cylinder portion 40, the engagement portion 30 provided on a tip end side of each extension portion 41, a pair of thin ribs 42, 42 extending from both outer surfaces of the extension portions 41, and a guide piece 39 provided on a tip end side of each thin rib 42. Although not particularly shown, a plurality of holding holes 41 and 43 are formed in the front side center of the cover flange portion 21 at positions corresponding to the holding cylinder portion 40, similarly to the embodiment shown in FIGS. 16 to 18. Further, the extension portion 60A is provided on an entire outer periphery of the resin member 50B.

In this embodiment, since the extension portion 60A is provided on the entire outer periphery of the resin member 50B, the plug 10B can be temporarily fixed to the member 1 in the stable posture without being inclined. When the peripheral wall portion 51, the receiving portion 53, and the like are deformed at the time of heating and softening of the resin member 50B, the peripheral wall portion 51 and the receiving portion 53 can be prevented from spreading outward, and can thus be firmly fixed to the member 1.

The present invention is not limited to the above-described embodiments, and various modifications are possible within the scope of the gist of the present invention, and such embodiments are also included in the scope of the present invention.

What is claimed is:

1. A hole plug configured to close an opening provided in a predetermined member, the hole plug comprising:
 a body portion including:
 a cover flange portion that covers the opening,
 an insertion portion that extends from the cover flange portion and that is inserted into the opening, and
 at least one pair of engagement portions that is provided on the insertion portion and that is engaged with a back side peripheral edge of the opening; and
 a thermosoftening resin member that is fixed to a back side peripheral edge of the cover flange portion and that is configured to be heated and melted so as to fix the cover flange portion to the predetermined member, wherein
 the thermosoftening resin member includes a bottom surface parallel to a direction orthogonal to an extension direction of the insertion portion, and an extension portion extending obliquely outward from the bottom surface of the thermosoftening resin member toward the predetermined member and intersecting the bottom surface, and
 the extension portion is elastically abutted against a front side of the predetermined member in a state where the engagement portion is engaged with the back side peripheral edge of the opening before melting of the thermosoftening resin member.

2. The hole plug according to claim 1, wherein at least one pair of the extension portions is provided, and the at least one pair of the extension portions is arranged to face each other in a direction orthogonal to a facing direction of the pair of engagement portions.

3. The hole plug according to claim 1, wherein the extension portion is provided on an entire periphery of the thermosoftening resin member.

4. The hole plug according to claim 1, wherein the thermosoftening resin member is fixed to an outer peripheral edge on a back side of the cover flange portion and is not provided at an inside of the outermost periphery of a front surface of the cover flange portion, and
 a gap is further provided between the thermosoftening resin member and the predetermined member in the state where the engagement portion is engaged with the back side peripheral edge of the opening before the melting of the thermosoftening resin member.

5. The hole plug according to claim 1, wherein both sides of the extension portion in a direction orthogonal to an extension direction thereof are formed to become wider toward a base end in the extension direction.

6. The hole plug according to claim 1, wherein the extension portion is provided at a position corresponding to a weld line generated when the thermosoftening resin member is injection-molded,
 the thermosoftening resin member is provided with a protruding portion protruding inward at a position that matches the extension portion provided at the position corresponding to the weld line, and
 a gap is provided between the protruding portion and the predetermined member in the state where the engagement portion is engaged with the back side peripheral edge of the opening before the melting of the thermosoftening resin member.

7. The hole plug according to claim 1, wherein an outer surface of the engagement portion has a plurality of steps, and a rib that extends in an insertion direction in which the insertion portion is inserted into the opening is formed on an outer surface of a step portion located at a position farthest from the cover flange portion.

8. The hole plug according to claim 1, wherein the thermosoftening resin member includes a receiving portion configured to receive a back side of the cover flange portion, and
 the receiving portion extends in the direction orthogonal to the extension direction of the insertion portion.

* * * * *